United States Patent [19]

Hancock

[11] Patent Number: 5,517,877

[45] Date of Patent: May 21, 1996

[54] COLLAPSIBLE STEERING COLUMN ASSEMBLY

[75] Inventor: Michael T. Hancock, Warwickshire, England

[73] Assignee: The Torrington Company, Torrington, Conn.

[21] Appl. No.: 249,114

[22] Filed: May 25, 1994

[30] Foreign Application Priority Data

Jun. 23, 1993 [GB] United Kingdom ............... 9312927
Jan. 24, 1994 [GB] United Kingdom ............... 9401163

[51] Int. Cl.⁶ .................... B62D 1/19; F16F 7/12
[52] U.S. Cl. ........................... 74/492; 188/371
[58] Field of Search ............... 74/492, 493; 280/775, 280/777; 188/371, 372

[56] References Cited

U.S. PATENT DOCUMENTS

| | | | |
|---|---|---|---|
| 3,195,685 | 7/1965 | Blackstone | 188/372 |
| 4,142,423 | 3/1979 | Ikawa | 74/492 |
| 4,630,716 | 12/1986 | Faust | 188/371 |
| 4,838,576 | 6/1989 | Hamasaki et al. | 74/492 X |
| 5,286,056 | 2/1994 | Speich | 188/371 X |

FOREIGN PATENT DOCUMENTS

| | | | |
|---|---|---|---|
| 0474400A2 | 3/1992 | European Pat. Off. | |
| 63-46972 | 2/1988 | Japan | 74/492 |
| 3-136973 | 6/1991 | Japan | 280/777 |
| 1120799 | 7/1968 | United Kingdom. | |

*Primary Examiner*—Allan D. Herrmann
*Attorney, Agent, or Firm*—Michael H. Minns

[57] ABSTRACT

A collapsible steering column assembly with means to absorb energy transmitted by the steering column upon collapse, including a deformable U-shaped wire clip engaged around a pair of pins. A skid member adjoins the clip and is coupled to the steering column so that, upon collapse of the steering column, the skid member is urged in a direction to deform the wire clip by drawing it over the pins. The clip and skid member are accommodated in a fixed mounting bracket for the steering column.

21 Claims, 3 Drawing Sheets

500;5,517,877

COLLAPSIBLE STEERING COLUMN ASSEMBLY

BACKGROUND OF THE INVENTION

This invention relates generally to collapsible steering column assemblies and more particularly to energy absorption mechanisms utilizing a deformable member to absorb energy upon collapse of the steering column.

United Kingdom Patent No. GB 1 120 799 discloses a collapsible steering column which is connected to a deformable element in the form of a flexible metal rod which is spot welded at one end to the column and bolted to the vehicle at the other end and which is passed around a pair of rollers so that collapse of the steering column pulls the rod around the rollers and in so doing deforms the rod and thus retards the collapse of the steering column.

SUMMARY OF THE INVENTION

In one aspect of the present invention, this is accomplished by providing a collapsible steering column assembly comprising: means for absorbing energy transmitted by the steering column upon collapse, said means including a deformable element associated with a mounting means of the steering column, the mounting means including a mounting bracket slidably housing a skid member coupled to the steering column and adjoining said deformable element, so that, upon collapse of the steering column, said skid member is urged in a direction to deform said deformable element which thereby absorbs collapse energy, and said deformable element being in the form of a length of deformable wire with arms embracing a pin, over which said wire is caused to be drawn by said skid member, thereby absorbing energy.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

According to the present invention, there is provided a collapsible steering column assembly including means to absorb energy transmitted by the steering column upon collapse, said means including a deformable element associated with a mounting means of the steering column, the mounting means including a mounting bracket slidably housing a skid member coupled to the steering column and adjoining said deformable element, so that, upon collapse of the steering column, said skid member is urged in a direction to deform said deformable element which thereby absorbs collapse energy, and said deformable element being in the form of a length of deformable wire with arms embracing a pin, over which said wire is caused to be drawn by said skid member, thereby to absorb energy.

Thus, the means to absorb collapse energy is transferred from the immediate surround of the steering column to the region of the mounting bracket.

The deformable wire may be in the form of a clip bent around two spaced pins with the skid member being located between the pins. Accordingly, upon collapse of the steering column, the skid member is urged between the pins and drags with it the wire clip which is pulled over and around the pins.

The outer ends of the wire clip can be confined within a chamber of the mounting bracket to prevent splaying thereof.

In an alternative form, there may be one or two separate wires, each wire embracing its own pin and being secured at one end. The pin in this case is fixed to the skid member so that movement of the skid member and pin causes the wire to be drawn around it. Two spaced apart pins may thus be provided, each with their own length of wire.

The or each member fixing one end of the or each wire, respectively, may be itself mounted by means of shear means such as shear pins which are provided to take the initial force of the pull on the or each wire and then subsequently allow the fixing means to break away.

As with the first embodiment, the outer end of the or each wire can be confined by a member to prevent splaying of the wire.

In each embodiment, the or each wire can be arranged to deform by extension of the wire as it is drawn around its associated pin.

In the second embodiment, the wire can be doubled back on itself so as to embrace its associated pin twice.

Figure 1:
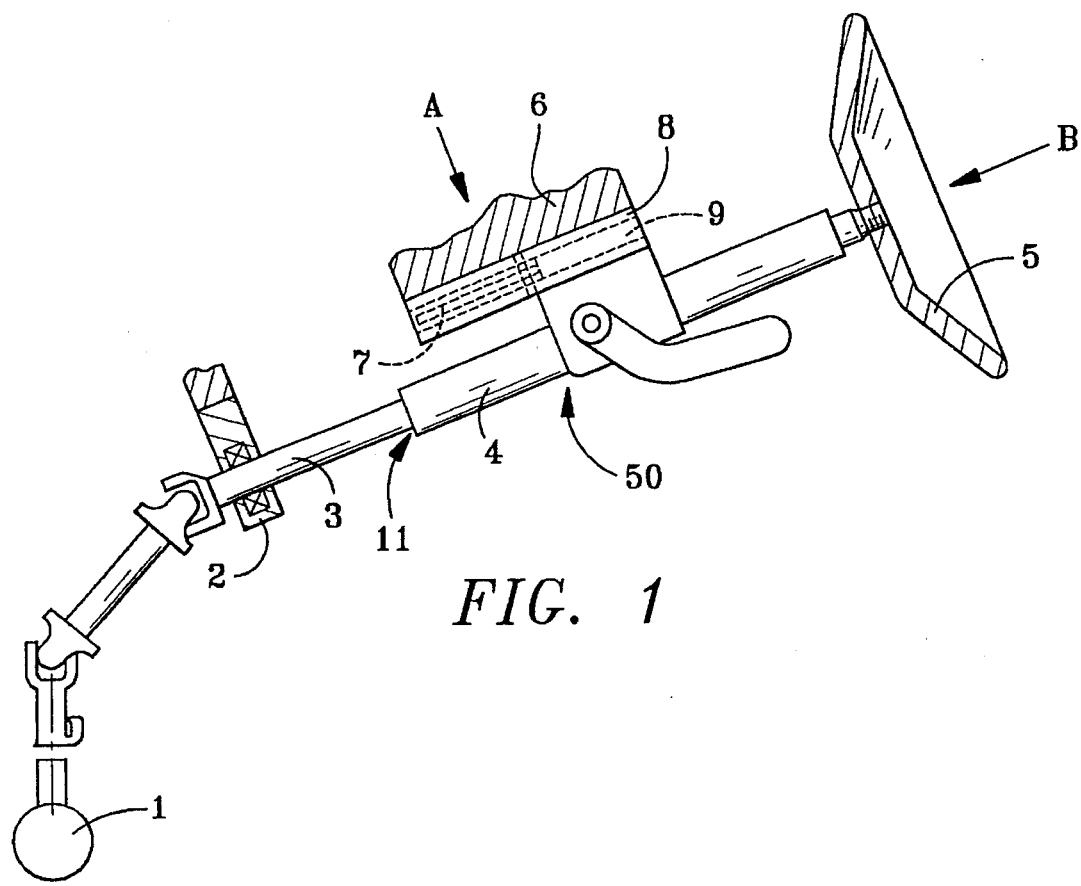
FIG. 1 is a diagrammatic side view of one embodiment of a collapsible steering column assembly.

Referring to FIG. 1, the steering column 50 includes a steering rack 1, a lower, fixed mounting point 2, an inner shaft 3 of the steering column, an outer shaft 4 of the steering column, the inner shaft and the outer shaft also known as a first shaft member and a second shaft member, (3,4) a steering wheel 5 and an upper fixed mounting point 6 for the steering column.

In the form illustrated in FIG. 1, the steering column is shown as being adjustable but the present invention can equally apply to a rigid steering column assembly.

Referring generally to FIGS. 1 to 4, the means to absorb energy transmitted by the steering column upon collapse, which occurs in the direction of arrow B, includes a deformable element in the form of a wire clip 7 associated with the upper mounting means 6. The mounting means 6 includes a mounting bracket 8 which slidably houses in grooves 8A a skid member 9. The skid member 9 is coupled to the outer shaft 4 and is located adjoining the wire clip 7.

Figure 2:
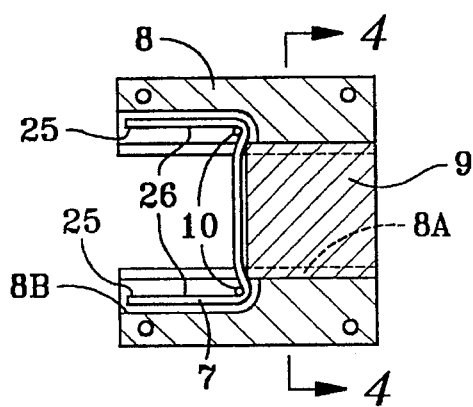
FIG. 2 is a diagrammatic view, partly in section, of part of the steering column assembly shown in FIG. 1, viewed in the direction of arrow A before steering column collapse.

As shown in FIG. 2, the wire clip 7 before steering column collapse is generally U-shaped with the two arms 26 of the U located about two spaced apart pins 10, the spacing of the pins 10 being such that the skid member 9 can pass between them in the grooves 8A. The outer, free arms of the clip 7 are confined within the bracket as illustrated at 8B, thus serving as a track, in order to prevent splaying of the arms. In the embodiment shown in FIG. 2, both ends 25 of the U-shaped wire clip 7 are unattached.

Figure 3:
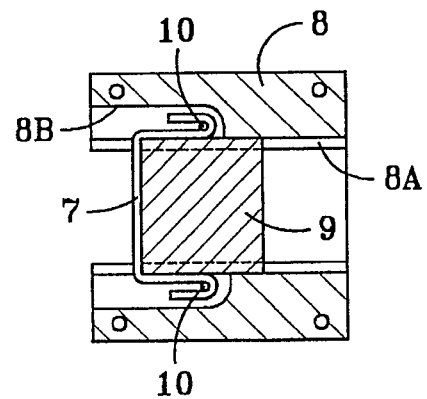
FIG. 3 is a view similar to FIG. 2, viewed in the direction of arrow A, after steering column collapse.
Figure 4:
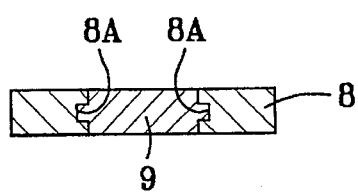
FIG. 4 is a sectional view taken along the line IV—IV in FIG. 2.

Upon vehicle crash, the steering wheel 5 is caused to move in the direction of arrow B and the skid member 9 is thereby urged in the same direction to engage and draw with it the clip 7, whose arms are dragged over the pins 10 as illustrated in FIG. 3, this having the effect of absorbing the energy transmitted by the steering column upon collapse.

Collapse of the steering column itself is accommodated by relative collapse between the inner shaft 3 and outer shaft 4 in the region of reference numeral 11.

Figure 5:
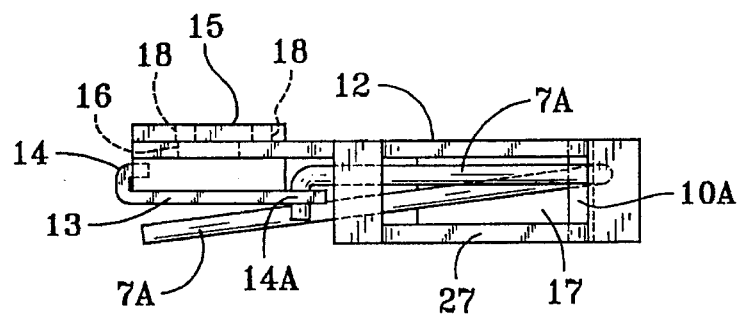
FIG. 5 is a diagrammatic side view of a second embodiment of a collapsible steering column assembly.
Figure 6:
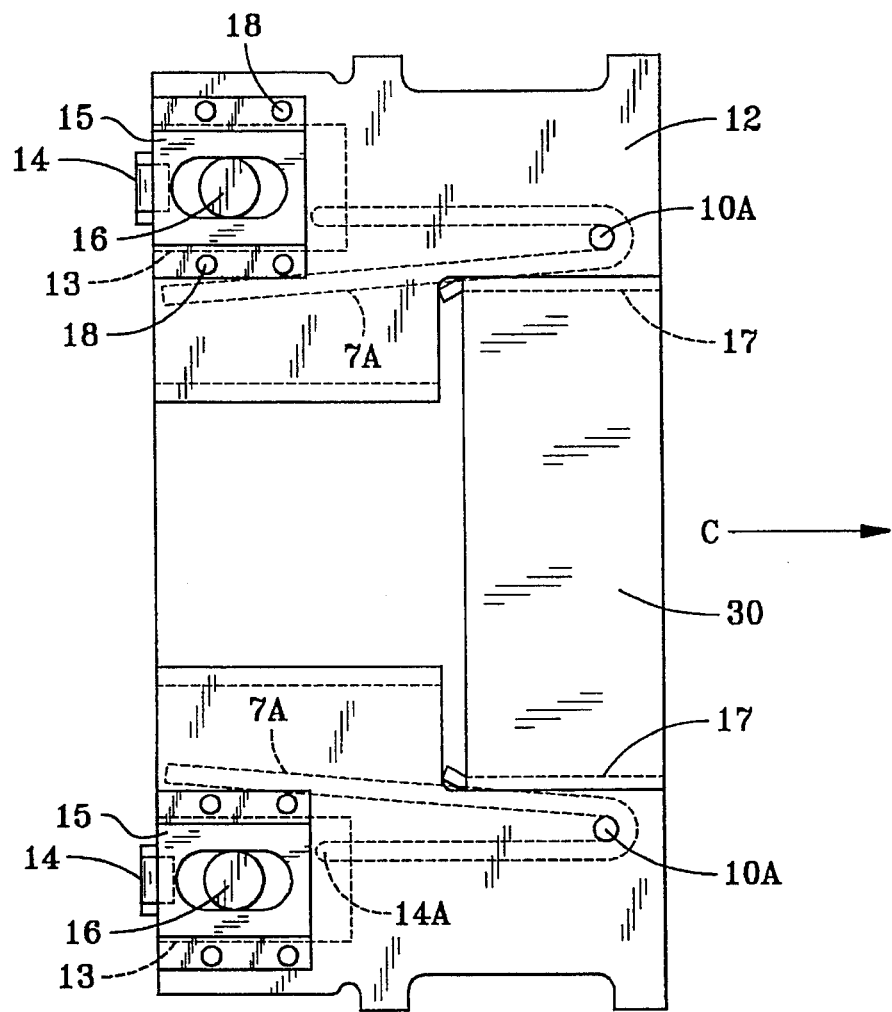
FIG. 6 is a diagrammatic plan view of the embodiment shown in FIG. 5.

FIGS. 5 and 6 show an alternative embodiment in which the wire 7A is, at least initially, held in a single location and movement of a pin 10A, fixed to the skid member 12, causes deformation of the wire. Preferably, skid member 12 is fixedly attached to the outer shaft 4. Also shown in FIG. 6 is an interconnecting cross plate 30.

More specifically, there are two lengths of wire 7A, each drawn around an associated pin 10A. Each pin 10A is fixed to the top plate 12 and a bottom plate 27.

A plate (or attachment member) 13 with a hooked end 14 is secured in a mounting block 15, the plate 13 receiving one end of the wire 7A, the end being secured by means of a rivet or the like. The plate 13 and mounting block 15 are in each case secured by respective bolts (not shown) through bolt holes 16 to the chassis of the vehicle.

Each wire 7A is bent around its associated pin 10A and is confined by a metal side plate 17 to prevent splaying of the wire as it is drawn around the pin 10A.

There are four molded plastics shear pins 18 which hold the plate 13 and mounting block 15 together with the top plate 12. The top plate 12 has a rectangular or V-shaped notch which provides clearance around the bolt which secures the mounting block 15 to the vehicle. This notch allows the top plate 12 to move in the direction of arrow C during impact of the vehicle.

During impact of the vehicle, the initial force drawing on the plate 13 is taken by the plastics shear pins 18 and once these shear pins are broken, the hooked plates 13, mounting blocks 15 and the energy absorbing wires 7A separate from the top plate 12. Then the top plate 12 and pins 10A are driven forwards, in the direction of arrow C, and downwards away from the driver and this causes the wires 7A to be drawn around the pins 10A and stretched. The loose end or free end of each wire is contained by the track formed by the metal side plate 17.

The preferred wire 7, 7A is a mild steel welding rod. The welding wire is copper coated to reduce friction. The diameter of the wire can be varied depending upon the energy to be absorbed.

Figure 7:
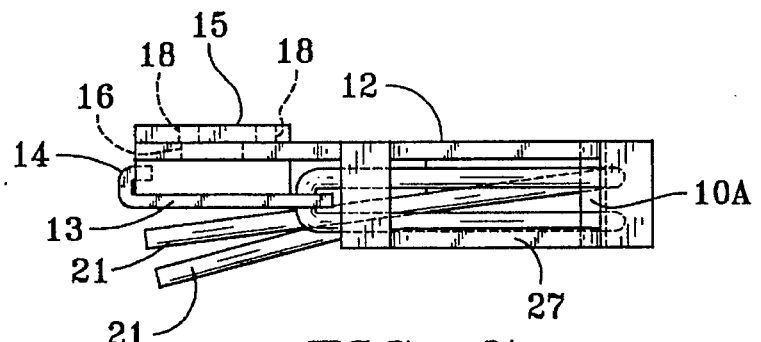
FIG. 7 is a diagrammatic side view similar to FIG. 5 but showing a modification thereof.
Figure 8:
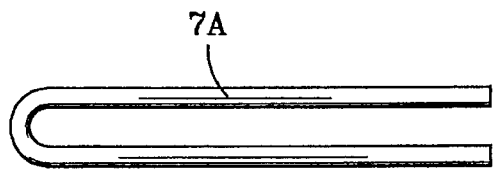
FIG. 8 is a typical view of a deformable wire bent into a primary form prior to mounting in the embodiment shown in FIG. 7.

In modification illustrated by FIGS. 7 and 8, each wire 7A is doubled back on itself through the hook plate 14 so as to bend twice around its associated pin 10A before being secured in the hooked plate 14. Preferably, both ends 21 of wire 7A are unattached.

Figure 9:
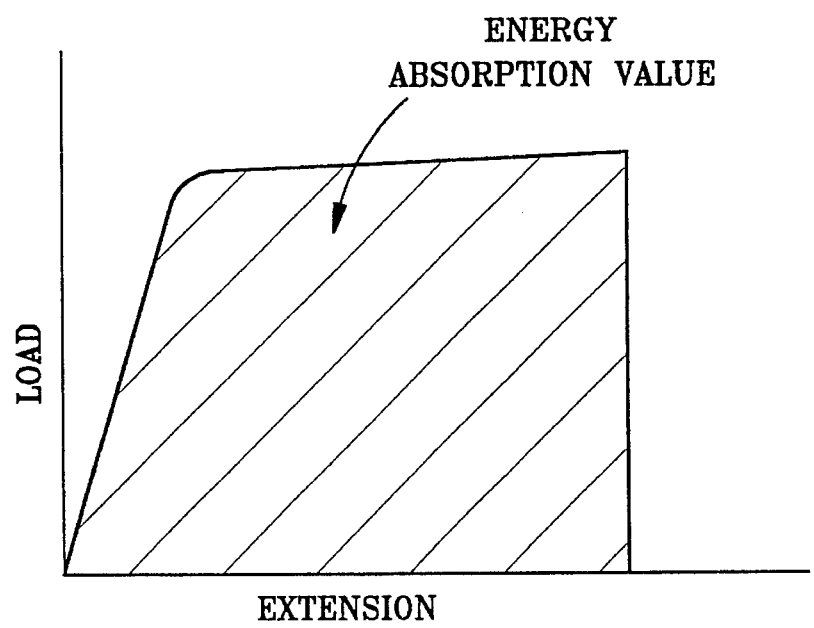
FIG. 9 is a graph of load against extension to illustrate energy absorption value as the steering column collapses.

FIG. 9 is a typical graph illustrating expected energy absorption. The graph shows the load or energy absorbed versus the movement of the upper portion of the steering column (or skid) relative to the fixed or lower portion of the steering column.

Having described the invention, what is claimed is:

1. A collapsible steering column assembly comprising:
   means for absorbing energy transmitted by the steering column upon collapse, said means including a deformable element associated with a mounting means of the steering column, the mounting means including a mounting bracket slidably housing a skid member coupled to the steering column and adjoining said deformable element, so that, upon collapse of the steering column, said skid member is urged in a direction to deform said deformable element which thereby absorbs collapse energy, and said deformable element being in the form of a length of deformable wire with arms embracing a pin, over which said wire is caused to be drawn by said skid member, thereby absorbing energy, there being two said pins and said wire being a generally U-shaped wire clip with arms embracing said pins, which are spaced-apart and between which said skid member can pass to draw the clip over the pins to deform it.

2. The assembly according to claim 1, wherein the arms of the wire are confined within the mounting bracket to prevent splaying.

3. The assembly according to claim 1, wherein said skid member is coupled to an outer shaft of the steering column.

4. The assembly according to claim 1, wherein said wire is arranged to deform by extension.

5. The assembly according to claim 1, wherein both ends of the U-shaped wire clip are unattached.

6. A collapsible steering column assembly comprising:
   means for absorbing energy transmitted by the steering column upon collapse, said means including a deformable element associated with a mounting means of the steering column, the mounting means including a mounting bracket slidably housing a skid member coupled to the steering column and adjoining said deformable element, so that, upon collapse of the steering column, said skid member is urged in a direction to deform said deformable element which thereby absorbs collapse energy, and said deformable element being in the form of a length of deformable wire with arms embracing a pin, over which said wire is caused to be drawn by said skid member, thereby absorbing energy, said pin being fixed to said skid member so that movement of the pin causes the wire to be drawn around it.

7. The assembly according to claim 6, wherein there are two wires, each embracing its own pin.

8. The assembly according to claim 7, wherein said wire is doubled over so as to embrace said pin twice.

9. An assembly according to claim 6, wherein said wire is secured at one end to an attachment member, the attachment member being shearably mounted to the skid member.

10. A collapsible steering column comprising:
    a first shaft member;
    a second shaft member axially slidable relative to the first shaft member; and
    a means for absorbing energy transmitted by the second shaft member upon collapse, said means comprising: a mounting bracket fixed to a portion of a vehicle; a skid member movably mounted to the mounting bracket, the skid member being attached to the second shaft member; a pin; and an energy absorbing deformable wire engaging the pin, the wire having at least one free end, the skid member, upon collapse, being urged in a direction to deform the wire, the wire being drawn over said pin by the skid member, the pin being fixedly attached to the skid member and a first end of the wire being fixedly attached to the mounting bracket.

11. The steering column according to claim 10, further comprising;

means for preventing splaying of the wire, the means for preventing splaying of wire comprising a side wall member being attached to the skid member.

12. The steering column according to claim 10, wherein the pin is fixedly attached to the mounting bracket.

13. The steering column according to claim 10, wherein the ends of the wire are unattached.

14. The steering column according to claim 10, wherein the deformation of the wire causes the wire to lengthen.

15. A collapsible steering column comprising:

a first shaft member;

a second shaft member axially slidable relative to the first shaft member;

a means for absorbing energy transmitted by the second shaft member upon collapse, said means comprising: a mounting bracket fixed to a portion of a vehicle; a skid member movably mounted to the mounting bracket, the skid member being attached to the second shaft member; a pin; and an energy absorbing deformable wire engaging the pin, the wire having at least one free end, the skid member, upon collapse, being urged in a direction to deform the wire, the wire being drawn over said pin by the skid member; and an attachment member shearably mounted to the skid member, the wire being fixedly attached to the attachment member.

16. A collapsible steering column comprising:

a first shaft member;

a second shaft member axially slidable relative to the first shaft member; and a means for absorbing energy transmitted by the second shaft member upon collapse, said means comprising: a mounting bracket fixed to a portion of a vehicle; a skid member movably mounted to the mounting bracket, the skid member being attached to the second shaft member; a pin; and an energy absorbing deformable wire engaging the pin, the wire having at least one free end, the skid member, upon collapse, being urged in a direction to deform the wire, the wire being drawn over said pin by the skid member, the number of pins being two, the pins being fixedly attached to the mounting bracket and said wire being a generally U-shaped wire clip with arms engaging said pins, the ends of the wire clip being unattached.

17. The steering column according to claim 16, wherein the ends of the wire are confined within the mounting bracket to prevent splaying of the wire.

18. A collapsible steering column comprising:.

a first shaft member;

a second shaft member axially slidable relative to the first shaft member; and a means for absorbing energy transmitted by the second shaft member upon collapse, said means comprising: a mounting bracket fixed to a portion of a vehicle; a skid member movably mounted to the mounting bracket, the skid member being attached to the second shaft member; a pin; and an energy absorbing deformable wire engaging the pin, the wire having at least one free end, the skid member, upon collapse, being urged in a direction to deform the wire, the wire being drawn over said pin by the skid member, the pin being fixedly attached to the skid member, the middle of the wire being fixedly attached to the mounting bracket and each portion of the wire extending from the mounting bracket engages the pin.

19. A collapsible steering column comprising:

a first shaft member;

a second shaft member axially slidable relative to the first shaft member; and a means for absorbing energy transmitted by the second shaft member upon collapse, said means comprising: a mounting bracket fixed to a portion of a vehicle; a skid member movably mounted to the mounting bracket, the skid member being attached to the second shaft member; two pins fixedly attached to the mounting bracket; and an energy absorbing deformable generally U-shaped wire clip, the arms of the wire clip engaging the pins, the ends of the wire clip being unattached, the skid member, upon collapse, being urged in a direction to deform the wire clip, the wire clip being drawn over said pin by the skid member, the ends of the wire clip being confined within the mounting bracket to prevent splaying of the wire.

20. A collapsible steering column comprising:

a first shaft member;

a second shaft member axially slidable relative to the first shaft member; and a means for absorbing energy transmitted by the second shaft member upon collapse, said means comprising: a mounting bracket fixed to a portion of a vehicle; a skid member movably mounted to the mounting bracket, the skid member being attached to the second shaft member; a pin fixedly attached to the skid member; an energy absorbing deformable wire, the wire being attached to the skid member, at least one end being unattached and a middle portion engaging the pin; and a means for preventing splaying of the wire, the means for preventing splaying comprising a side wall member attached to the skid member, the skid member, upon collapse, being urged in a direction to deform the wire, the wire being drawn over said pin by the skid member.

21. The steering column according to claim 20, wherein the middle of the wire is fixedly attached to the mounting bracket, each portion of the wire extending from the mounting bracket engaging the pin, and each end of the wire being unattached.

* * * * *